United States Patent [19]

Duval et al.

[11] Patent Number: 5,320,860
[45] Date of Patent: Jun. 14, 1994

[54] RETORT-STABLE LOW SOLID CHEESE BASE COMPOSITION

[75] Inventors: David F. Duval, Arlington, Tex.; Kim C. Kruhmar, Moorpark, Calif.; Charles E. Ratcliff, Bedford, Tex.

[73] Assignee: Recot, Inc., Plano, Tex.

[21] Appl. No.: 38,075

[22] Filed: Mar. 29, 1993

Related U.S. Application Data

[63] Continuation of Ser. No. 691,485, Apr. 25, 1991, abandoned.

[51] Int. Cl.⁵ ............................................. A23C 19/09
[52] U.S. Cl. .................................. 426/582; 426/407; 426/409; 426/521; 426/575; 426/578; 426/589; 426/626; 426/627; 426/654
[58] Field of Search ............... 426/521, 582, 626, 627, 426/654, 578, 575, 589, 407, 409

[56] References Cited

U.S. PATENT DOCUMENTS

| | | | |
|---|---|---|---|
| 1,186,524 | 6/1916 | Kraft | 426/582 |
| 1,374,141 | 4/1921 | Eldredge | 426/582 |
| 1,936,872 | 11/1933 | Frederiksen | 99/11 |
| 3,741,774 | 6/1973 | Burkwall | 426/582 |
| 4,568,555 | 2/1986 | Spanier | 426/582 |
| 4,840,806 | 6/1989 | Hyldon et al. | 426/270 |

OTHER PUBLICATIONS

"Evaluation of Factors Involved in Antibotulinal Properties of Pasteurized Process Cheese Spreads," Journal of Food Protection 49 (7), pp. 526–531 (Jul. 1986) by Tanaka et al.

*Primary Examiner*—Helen Pratt
*Attorney, Agent, or Firm*—Rothwell, Figg, Ernst & Kurz

[57] ABSTRACT

A cheese base (cheese dip) composition has a low total solids content, a low cheese content, a low reducing sugar content and is stable to relatively high heat retort conditions.

30 Claims, No Drawings

RETORT-STABLE LOW SOLID CHEESE BASE COMPOSITION

This is a continuation of application Ser. No. 07/691,485, filed Apr. 25, 1991, now abandoned.

BACKGROUND OF THE INVENTION

Field of the Invention

The present invention relates to cheese base products, also known as cheese spreads, which are stable under retort packaging conditions. More particularly, the present invention provides a low-solids cheese base product which is useful for the preparation of cheese dips and similar consumer products, and does not degrade when exposed to high temperature sterilization during retort.

Description of the Background Art

The poor heat stability of cheese dips and other dairy products has long been recognized in the food industry. Cheese-containing products usually are susceptible to "browning" upon exposure to significant heat. Browning is a term commonly employed for describing the color and physical changes caused by the reaction of reducing sugars, typically lactose, galactose and glucose, with the α-amino group of lysine or any other primary amine present in a food product. In addition to the undesirable color change, this reaction can cause physical changes to the products as products of the browning reaction decompose and polymerize forming melanoidins and other undesirable end products.

The presence or potential presence of undesirable organisms in dairy products requires the application of heat, or an acceptable alternative, during the packing process in order to reduce or eliminate both living and dormant (spores) cells of pathogenic and non-pathogenic organisms. Presently, however, there is no generally accepted substitute for the use of heat in the preparation of shelf stable dairy products, such as cheese dips.

In addition to the practical necessity of heat treatment to prevent the growth of organisms, government regulations provide strict guidelines regarding the heat treatment of various packaged dairy products. The regulations focus on a variety of factors, including the nature of the ingredients in the product, the expected and advertised shelf life, and anticipated storage conditions both in the retail store and at the consumer's home, in arriving at heat treatment requirements.

The present invention relates to products known in the food industry as processed "cheese bases" or "cheese sauces." Broadly defined, such products are stable emulsions of cheese, water, thickening agents, emulsifying salts, stabilizing agents, fillers, colors and flavors. Of course, not all of these ingredients need be present in all cheese base products. While natural or fresh cheeses contain living microbial cultures, and thus are constantly undergoing chemical change, the processed cheese bases need to be stabilized against such change, thus providing acceptable shelf life and the ability to avoid refrigeration.

Pasteurized process cheese spreads are one type of cheese base in common use in the food industry. Under certain circumstances prescribed by government regulations, pasteurization, a relatively mild heat treatment that does not cause browning, may be used to produce shelf stable pasteurized process cheese spreads. In the United States, the applicable regulations are found at 21 CFR 133B, "Requirements for Specific Standardized Cheese and Related Products," and specifically in §133.79, "Pasteurized Process Cheese Spreads." These regulations exempt certain cheese base products from the need for more vigorous heating (for example retort heating, which would destroy the product by causing excessive browning and de-stabilization of dairy proteins), provided certain formulation requirements are met. One such requirement met by the pasteurized processed cheese spreads is the presence of at least 50% by weight of natural cheese. Other factors include low pH, low water activity and the presence of certain phosphate salts. Tanaka et al., "Evaluation of Factors Involved in Antibotulinal Properties of Pasteurized Process Cheese Spreads," J. Food Protection 49 (7), pp. 526–531 (July 1986) provides a useful overview.

Cheese bases according to the present invention provide the extended shelf life, flavor and richness of pasteurized processed cheese spreads, as well as additional advantages. The higher water content (and lower natural cheese content) reduces production costs of the cheeses bases. The cheese bases are stable to freeze/thaw conditions, and due to lower cheese requirements, are more amenable to flavor and texture variation and control. The use of extremely low reducing sugar-containing cheeses advantageously eliminates browning even at the high heat loads encountered during the retort process.

Except as provided in the governmental regulation, low acid cheese products, including cheese base products as described herein, must be exposed to severe heat sterilization sufficient to kill *C. botulinum* spores. Low-acid aseptic processing technology, delivering high heat to the product over a relatively short (15 to 30 seconds) time frame, can be employed to sterilize low acid cheese-containing products packaged in metal cans or various plastic containers. Glass packaging techniques generally require the use of conventional retort technology, however. Retort packaging delivers high heat (typically in excess of 250° F.) to the packaged product over a period of approximately 40 minutes. Unfortunately such heat treatment can cause severe browning, and for all practical purposes destroys conventional cheese base products formulated for pasteurization or aseptic processing.

U.S. Pat. No. 4,568,555 (Spanier; Feb. 4, 1986) describes a reportedly shelf stable cheese sauce which can contain dehydrated fruit and/or vegetable pieces. The preparation of the cheese sauce involves preparing a starch/gum slurry, heated to 117°–210° F. To this slurry a mixture of cheese (5 to 15% by weight of cheese base), fats, water and flavorants are added. The sauce is stored in jars which are then capped and sterilized by retorting.

Thus, there has remained a need in the food industry for a cheese base product, for use as a cheese dip and the like, which is stable to the retort process and possesses flavor, texture and consistency as good as or superior to the pasteurized process cheese spread.

SUMMARY OF THE INVENTION

The present invention provides a cheese base product, suitable for use as a packaged, shelf-stable cheese dip or cheese sauce, that is stable to retort packaging conditions. The heat-processed cheese bases to which this invention is directed contain a relatively low overall solids concentration (40% or less solids), a low cheese content (less than about 25% by weight, preferably less than 15% by weight), a low reducing sugar content (less than 1% by weight), preferably with no added gum stabilizers or binding agents such as carrageen or guar gum. These cheese bases are stable to the retorting process, wherein heat is applied to sealed glass containers of the finished product. This stability to retort distinguishes these cheese bases from the pasteurized process cheese spreads (PPCS), which are not stable to the prolonged, high heat of the retorting process. Vegetable matter, such as chopped tomatoes, jalapeno peppers and chile peppers can be combined with the cheese base to produce filled or "chunky" cheese dips favored by consumers.

In one aspect the present invention provides a retort-stable low cheese, low acid cheese base composition comprising about 5% to about 25% by weight (preferably 5% to about 15%) of cheese, the remainder of the cheese base composition comprising starch, fat and water, said cheese base composition comprising no more than about 1% by weight of reducing sugar and less than 40% by weight of total solids, whereby said cheese base composition, when packaged in sealed glass jars, is stable to prolonged retort heating at a temperature above about 250° F.

In another aspect of the invention, a vegetable and cheese dip is comprised of the shelf-stable cheese base product described above and pH-adjusted vegetable matter having an adjusted pH of about 5.5 or higher. The relatively high pH of the vegetable matter (typically chopped tomatoes and peppers are used in the preparation of Mexican-style "Nacho" cheese dip) prevents destabilization of the product due to the denaturation and precipitation of dairy proteins present in the cheese base. Typically the "vegetable matter" will be canned, drummed or jarred vegetables, such as canned tomatoes and peppers, having a relatively acidic pH as packaged, i.e. significantly less than about 5.5 at 25° C., and usually about 3.0 to 4.0.

DETAILED DESCRIPTION OF THE PREFERRED EMBODIMENTS

The low solids cheese base compositions of the present invention are characterized by having a total moisture content of at least about 60%, typically from about 60 to about 80%, and a total natural cheese content of less than about 15% by weight. The cheese base can be based upon either a single type of natural cheese, or upon a blend of cheeses. The cheeses preferred for use in the present invention have low levels of reducing sugars. These include, first, the washed curd type cheeses. Examples of washed curd cheeses include Monterey Jack, Colby, Mozzerella and Provolone cheeses. Other cheeses having low overall levels of reducing sugars are the cheddars, and other cheese varieties which have been treated with bacterial cultures containing heterofermentive organisms, i.e., organisms that are capable of metabolizing simple pentose and hexose sugars, such as glucose and galactose, as hydrolysis products of lactose. As the aged cheddars, however, often solubilize poorly in processed cheese emulsions, the washed curd cheeses, especially Monterey Jack, are preferred. Young cheddars solubilize well but can contain significant residual amounts of lactose, galactose and glucose.

Minor amounts (on the order of 1 to 2%) of enzyme-modified cheeses may be employed in the cheese bases to enhance the cheese flavor of the compositions. The enzyme-modified cheeses are known for their intense flavor, and thus are used sparingly. Desirably, the cheese or cheeses employed will provide a total reducing sugar content of less than about 1%, and preferably less than 0.5% by weight. The reducing sugars lactose, glucose and galactose should be avoided. Pentose sugars (e.g. fructose) are to be particularly avoided in the formulation of these products.

A particularly preferred cheese is a washed-curd Monterey Jack cheese having a maximum moisture content of about 42%, with residual lactose of less than 0.1% and residual galactose of less than 0.1%, preferably less than 0.05%.

The cheese base compositions are manufactured in a jacketed liquefier, or any other suitable vessel. The vessel is filled with a suitable volume of water, which is heated to and maintained at 160° to 200° F. under agitation. A solution of buffer and emulsifier salts is prepared by adding the same to the hot water. Examples of suitable salts include mono- and dibasic sodium phosphate, mono- and dibasic potassium phosphate, sodium and potassium tripolyphosphate, sodium hexametaphosphate and mixtures of the same. A particularly preferred salt package contains 0.7% disodium phosphate, 0.3% sodium citrate and 0.1% sodium hexametaphosphate, based on the total weight of the cheese base composition.

The salts are stirred until a clear solution is obtained. The desired cheese or cheeses are added to the solution, and with vigorous agitation will form a smooth suspension. Cheese sufficient to impart a total cheese content of less than 15% by weight, typically from about 9 to 13% by weight, is added. The cheese preferably is shredded or cubed and added in small pieces which have equilibrated to room temperature.

After the cheese(s) have liquified, a mixture of fat and emulsifier is added thereto. Fats and/or oils are added in amounts sufficient to impart a smooth consistency, flavor and acceptable "mouthfeel" characteristics to the final cheese base product. The cheese base compositions typically contain from about 3.0 to about 20.0% by weight of at least one fat, of which the following are examples: partly hydrogenated soybean, corn, cottonseed, canola, sunflower, safflower, coconut, palm, palm kernel and other vegetable oils. Anhydrous milk fat, butter fat and other dairy fats also are acceptable for use in the cheese base. Other animal fats, such as lard or tallow, may be used once rendered and refined for food use.

Examples of suitable emulsifiers include mono and diglycerides, lecithin and mixtures thereof. Emulsifiers are added in amounts sufficient to adequately emulsify the cheese and fat suspension. A preferred emulsifier package comprises about 0.02 to 1.0%, typically about 0.1% by weight, of the cheese base composition. The emulsifier includes both mono and di-glycerides, has a mono-glyceride content of about 50 to 55% and a melting point in the range of 80°-145° F.

Following a brief period in which the suspension is stirred, on the order of 1 to 2 minutes, a dry mix containing maltodextrin and the desired starches is added. From about 3.0 to about 11.0% by weight of at least one maltodextrin having a dextrose equivalent (DE) of 8 or lower is desired in the final cheese base product. Suitable maltodextrins are commercially available, being derived from for example corn, wheat, rice, tapioca or potato starch which has been partially hydrolyzed by acids or enzymes.

The preferred starches make up a slow-gelling starch mixture. A sufficient quantity of starch is added to provide a final starch content of from about 3 to about 20%, preferably about 4 to about 8% by weight. Suitable starches include at least one starch selected from modified (heat resistant), unmodified or lightly modified waxy or dent corn starches, potato, rice, wheat, barley, sorghum and tapioca starches. A blend of modified and unmodified (or lightly modified) waxy corn starch, comprising a ratio of from 6:1 to 3:1, most preferably 4:1 of modified:unmodified starch is preferred.

Finally, additional flavor ingredients and color additives are added as desired. Total mix time is approximately 10 minutes in the liquefier vessel, during which time the temperature is maintained at approximately 170° F. The mix is then homogenized in a two-stage homogenizer at approximately 500 psi in the first stage and 1700 psi in the second stage, and then pumped to a second jacketed mix tank (a "finish tank") where it is maintained at approximately 170° to 185° F. with gentle agitation. The mixture is then pumped into a filler apparatus and filled into glass jars.

The cheese base is especially well suited for use in preparing a filled or "chunky" style cheese dip or sauce containing vegetables, such as tomatoes and peppers. To prepare such products, large pieces of tomato, green chili peppers and jalapeno peppers (for example) are gently worked into the base in the finish tank to form a finished cheese dip product.

The invention is not limited to the inclusion of tomatoes and peppers in the cheese base mix; other vegetables, fruits, nuts and other materials may be added to the base to produce a variety of cheese dip or cheese sauce products. As disclosed in our co-pending U.S. Pat. application Ser. No. 691,484, filed of even date herewith and incorporated by reference herein, it is desirable to buffer the pH of the vegetables o other acidic materials added to the base so as to avoid breakdown of the dairy proteins present therein. As described in said co-pending application, acidic vegetable matter is treated with a buffer solution and allowed to equilibrate until the pH of the vegetables is about 5.5 or higher. Examples of useful vegetable matter include but are not limited to whole, chopped, sliced or otherwise comminuted tomatoes, tomatillos, peppers including chili, jalapeno, bell, serrano, habanero and Anaheim peppers, onions, scallions, beans, peas, corn, broccoli, asparagus, cauliflower, carrots and potatoes. For the purposes of this disclosure, "vegetable matter" also includes various nuts, such as peanuts, cashews, pistachios, pecans, walnuts and almonds, various fruits such as apples, strawberries, blueberries, blackberries and raspberries, and pasta in any of its forms.

Once the temperature of the cheese base product reaches about 140° to 200° F., the mixture is pumped to a jar filler and filled jars are then packed hot into a rotating water immersion retort for heat treatment. The temperature of the filled jars should not drop below about 130° F. before the beginning of the heat treatment process in order to maintain the initial viscosity of the product and to shorten the time necessary for the heat treatment process itself. Once in the retort, the chamber is closed and hot water (250°-280° F.) is added under pressure. Rotation can be at a rate of 10-20 RPM. The sterilization cycle can take between 10 and 60 minutes, usually between 30 and 45 minutes, depending upon the viscosity and temperature of the cheese base. The total heat exposure of the product should be of an $F_0$ value between 5 and 20, in order to provide good sterility and maximal stability of the cheese base. Preferably, the $F_o$ value will lie between 10 and 15.

Unlike pasteurized process cheese spreads, which are destroyed or unsuitably degraded by heat treatment during retort, the cheese base products of the present invention are stable to retort conditions. Advantageously, the finished product retains good cheese color, flavor and texture, and browning is avoided. These excellent characteristics are retained through at least one year of shelf life under retail store conditions.

The following Examples illustrate the present invention. Example 1 represents the successful application of this invention, providing a shelf stable, retort stable low solids cheese base composition.

EXAMPLE 1

| Ingredient | Total Percent |
| --- | --- |
| Water | 62.8 |
| Monterey Jack Cheese | 12.9 |
| Fat | 7.4 |
| Maltodextrin (DE $\leq$ 5) | 5.3 |
| Waxy Starch (modified) | 5.6 |
| Waxy Starch (unmodified) | 1.4 |
| Enzyme Modified Cheese | 1.3 |
| Disodium Phosphate | 0.7 |
| Monosodium Glutamate | 0.35 |
| Sodium Citrate | 0.3 |
| Sodium Hexametaphosphate | 0.1 |
| Table Salt | 1.3 |
| Monoglycerides | 0.1 |
| Citric Acid | 0.05 |
| Natural and Artificial Color | 0.25 |
| Acetic Acid | 0.05 |
| Spices | 0.03 |

Example 2 represents an unsuccessful attempt at the formulation of a low solids cheese base composition, and is representative of commercially-available products which are aseptically packaged. The metabolic by-products of the bacteria present in cheese cultures (organic and free fatty acids) over time denature and insolubilize native proteins, leading to a product that is difficult to emulsify in commercial applications.

EXAMPLE 2

| Ingredient | Total Percent |
| --- | --- |
| Water | 62.1 |
| Aged Cheddar Cheese | 12.9 |
| Fat | 7.4 |
| Buttermilk Powder | 5.3 |
| Waxy Starch (modified) | 5.0 |
| Waxy Starch (unmodified) | 2.0 |
| Enzyme Modified Cheddar | 1.3 |
| Disodium Phosphate | 0.5 |
| Monosodium Glutamate | 0.35 |
| Table Salt | 1.35 |
| Monoglycerides | 0.05 |
| Coloring (Annatto) | 0.17 |
| Acetic Acid | 0.05 |
| Spices | 0.03 |
| Cheese Enhancer | 1.0 |
| Autolyzed Yeast | 0.05 |

Example 3 represents the successful application of this invention, providing a "chunky," vegetable-containing cheese dip product of low cheese content.

EXAMPLE 3

| Ingredient | % By Weight |
| --- | --- |
| Water | 50.0 |
| Monterey Jack Cheese | 10.30 |
| Fat | 6.0 |
| Maltodextrin (DE ≤ 5) | 4.2 |
| Waxy Starch (modified) | 4.5 |
| Waxy Starch (unmodified) | 1.2 |
| Vegetables | 20.0 |
| Enzyme Mod. Cheddar | 1.0 |
| Disodium Phosphate | 0.60 |
| Monosodium Glutamate | 0.3 |
| Sodium Citrate | 0.3 |
| Sodium Hexametaphosphate | 0.08 |
| Salt | 1.0 |
| Monoglycerides | 0.1 |
| Citric Acid | 0.05 |
| Coloring (Natural and Artificial) | 0.30 |
| Acetic Acid | 0.05 |
| Spices | 0.02 |

Example 4 represents an unsuccessful attempt at the formulation of a low solids, vegetable-containing cheese base composition, and is representative of commercially-available products which are aseptically packaged. The metabolic by-products of the bacteria present in cheese cultures (organic and free fatty acids) over time denature and insolubilize native proteins, leading to a product that is difficult to emulsify in commercial applications.

EXAMPLE 4

| Ingredient | % By Weight |
| --- | --- |
| Water | 50.00 |
| Aged Cheddar Cheese | 10.00 |
| Fat | 6.0 |
| Buttermilk Powder | 5.0 |
| Waxy Starch (modified) | 4.0 |
| Waxy Starch (unmodified) | 1.8 |
| Tomatoes (Diced Canned) | 10.0 |
| Jalapenos (Diced Canned) | 4.0 |
| Green Chilies (Diced Canned) | 4.0 |
| Onions (Dehydrated) | 1.0 |
| Enzyme Modified Cheese | 1.0 |
| Disodium Phosphate | 0.5 |
| Monosodium Glutamate | 0.2 |
| Sodium Citrate | 0.1 |
| Salt | 1.0 |
| Monoglycerides | 0.05 |
| Coloring (Annatto) | 0.18 |
| Acetic Acid | 0.05 |
| Spices | 0.02 |
| Cheese Enhancer | 0.7 |
| Autolyzed Yeast | 0.4 |

EXAMPLE 5

Method of Preparation of Cheese Base/Vegetable Mixture

Vegetables which have been pH-buffered in accordance with the method described herein and in our co-pending application referenced above are gently stirred into hot cheese base which is held at a temperature of 165°-180° F. When even mixing has been obtained, the finished sauce is pumped into a filler which dispenses the sauce at a temperature of about 160°-185° F. into glass jars which are then sealed and placed in a retort. Once in the retort, the chamber is closed and hot water (250°-280° F.) is added under pressure. Rotation can be at a rate of 10-20 RPM. The sterilization cycle can take between 10 and 60 minutes.

Although the invention has been described in connection with certain preferred embodiments and specific examples, it is not so limited. Modifications and variations within the scope of the appended claims will be readily apparent to those of ordinary skill in this field.

What is claimed is:

1. A retort-stable low cheese content, low acid cheese base composition comprising about 5.0% to about 25% by weight of natural cheese, the remainder of the cheese base composition comprising starch, fat and water, said cheese base composition comprising less than about 1% by weight of reducing sugar and less than 40% by weight of total solids, and being formulated without added gums whereby said cheese base composition, when packaged in sealed glass jars, is stable to retort heating at a temperature above about 250° F.

2. A cheese base composition of claim 1 comprising about 5% to about 15% by weight of cheese.

3. A cheese base composition of claim 1, wherein the cheese is a washed curd cheese.

4. A cheese base composition of claim 3 wherein the cheese comprises a washed curd Monterey Jack cheese comprising less than about 0.1% by weight of lactose and less than about 0.05% by weight of galactose.

5. A cheese base composition of claim 1, wherein the cheese comprises one or more of Monterey Jack, Colby, Mozzarella and Provolone.

6. A cheese base composition of claim 1 comprising about 3% to about 20% by weight of starch.

7. A cheese base composition of claim 6 or 7, wherein the starch is selected from the group consisting of waxy starch, modified heat resistant waxy starch and combinations thereof.

8. A cheese base composition of claim 7, wherein the starch comprises one or more of corn, potato, rice, wheat, barley, sorghum or tapioca starch.

9. A cheese base composition of claim 8, wherein the starch comprises a waxy corn starch.

10. A cheese base composition of claim 1 comprising about 4% to about 8% by weight of starch.

11. A cheese base composition of claim 10 wherein the starch component consists essentially of a blend of modified and unmodified waxy corn starch at a ratio of from 6:1 to 3:1 of modified to unmodified starch.

12. A cheese base composition of claim 1, wherein the fat comprises one or more of soybean oil, corn oil, cotton seed oil, palm oil, anhydrous milk fat, butter fat, lard or tallow.

13. A cheese base composition of claim 1, wherein the fat comprises partially hydrogenated soybean oil.

14. A cheese base composition of claim 1 comprising about 60% to about 80% by weight of water.

15. A cheese base composition of claim 1 further comprising maltodextrin.

16. A cheese base composition of claim 15 comprising about 3% to about 11% by weight of maltodextrin.

17. A cheese base composition of claim 16 wherein the maltodextrin has a dextrose equivalent number of 8 or lower.

18. A cheese base composition of claim 16, wherein the maltodextrin is derived from one or more of corn, wheat, rice, tapioca or potato starch.

19. A cheese base composition of claim 1, further comprising an alkali metal or alkaline earth buffer or emulsifier salt selected from the group consisting of disodium phosphate, monosodium phosphate, sodium citrate, sodium hexametaphosphate, sodium tripolyphosphate and potassium tripolyphosphate.

20. A cheese base composition of claim 1 further comprising an emulsifier.

21. A cheese base composition of claim 20 comprising about 0.05% to about 0.2% by weight of a glyceride emulsifier.

22. A cheese base composition of claim 20 wherein the glyceride emulsifier comprises a mono- or diglyceride.

23. A cheese base composition of claim 1 further comprising a coloring agent.

24. A cheese base composition of claim 1 further comprising a seasoning or flavorant.

25. A cheese base composition of claim 24 wherein the seasoning comprises one or more of white pepper, salt, monosodium glutamate or table salt.

26. A cheese base composition of claim 24 comprising a flavorant selected from the group consisting of lactic acid, phosphoric acid, citric acid, acetic acid and enzyme modified cheddar cheese.

27. A cheese dip product comprising about 60% to about 95% by weight of a cheese base composition of claim 1, and about 5% to about 40% by weight of pH-adjusted vegetable matter having a pH above the isoelectric point of dairy proteins present in the cheese base composition.

28. A cheese dip product of claim 27 wherein the vegetable matter comprises one or more of tomatoes and peppers.

29. A cheese dip product of claim 28 wherein the vegetable matter has an equilibrated pH of at least about 5.5.

30. A cheese base composition of claim 1 wherein the starch component consists essentially of a blend of modified and unmodified waxy corn starch at a ratio of from 6:1 to 3:1 of modified to unmodified starch.

* * * * *